(12) United States Patent
Oriakhi et al.

(10) Patent No.: US 10,557,048 B2
(45) Date of Patent: Feb. 11, 2020

(54) INKS

(71) Applicant: Fujifilm Imaging Colorants, Inc., New Castle, DE (US)

(72) Inventors: Christopher Oriakhi, New Castle, DE (US); Ravi Shankar, New Castle, DE (US); Eda Wilson, New Castle, DE (US); Michael Finnegan, New Castle, DE (US); Jerrold Baker, New Castle, DE (US); Keith Delaney, New Castle, DE (US); Anthony Fiumenero, New Castle, DE (US); Philip John Double, Manchester (GB); Hamid Shirazi, New Castle, DE (US)

(73) Assignee: Fujifilm Imaging Colorants, Inc., New Castle, DE (US)

( * ) Notice: Subject to any disclaimer, the term of this patent is extended or adjusted under 35 U.S.C. 154(b) by 4 days.

(21) Appl. No.: 15/534,076

(22) PCT Filed: Dec. 10, 2015

(86) PCT No.: PCT/GB2015/053782
§ 371 (c)(1),
(2) Date: Jun. 8, 2017

(87) PCT Pub. No.: WO2016/092310
PCT Pub. Date: Jun. 16, 2016

(65) Prior Publication Data
US 2018/0237651 A1    Aug. 23, 2018

Related U.S. Application Data

(60) Provisional application No. 62/090,926, filed on Dec. 12, 2014.

(51) Int. Cl.
| | | |
|---|---|---|
| *C09D 11/38* | (2014.01) | |
| *C09D 11/106* | (2014.01) | |
| *C09D 11/322* | (2014.01) | |
| *B41J 2/18* | (2006.01) | |

(52) U.S. Cl.
CPC ............... *C09D 11/38* (2013.01); *B41J 2/18* (2013.01); *C09D 11/106* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 4,365,035 A | 12/1982 | Zabiak | |
| 5,542,969 A | 8/1996 | Hirasa et al. | |
| 5,667,569 A | 9/1997 | Fujioka | |
| 5,738,714 A | 4/1998 | Hirasa et al. | |
| 6,004,389 A | 12/1999 | Yatake | |
| 6,011,098 A | 1/2000 | Kashiwazaki et al. | |
| 6,087,416 A | 7/2000 | Pearlstine et al. | |
| 6,328,393 B1 | 12/2001 | Lin et al. | |
| 6,478,862 B1 | 11/2002 | Elwakil | |
| 6,488,751 B1 | 12/2002 | Takemoto | |
| 6,491,748 B2 | 12/2002 | Watanabe | |
| 6,598,967 B1 | 7/2003 | Chen et al. | |
| 6,602,333 B2 | 8/2003 | Miyabayashi | |
| 6,644,799 B2 | 11/2003 | Han-Adebekun et al. | |
| 6,679,598 B2 | 1/2004 | Kato et al. | |
| 6,713,531 B2 | 3/2004 | Iijima | |
| 6,715,869 B1 | 4/2004 | Reem et al. | |
| 6,805,735 B2 | 10/2004 | Taniguchi et al. | |
| 6,848,777 B2 | 2/2005 | Chen et al. | |
| 6,878,197 B2 | 4/2005 | Chen et al. | |
| 6,886,931 B2 | 5/2005 | Yatake | |
| 6,908,188 B2 | 6/2005 | Reczek et al. | |
| 6,953,613 B2 | 10/2005 | Reem et al. | |
| 7,160,376 B2 | 1/2007 | Watanabe et al. | |
| 7,201,794 B2 | 4/2007 | Ito et al. | |
| 7,247,198 B2 | 7/2007 | Fujioka et al. | |
| 7,264,664 B2 | 9/2007 | Kamoto et al. | |
| 7,284,851 B2 | 10/2007 | Bannai et al. | |
| 7,354,476 B2 | 4/2008 | Beach et al. | |
| 7,423,076 B2 * | 9/2008 | Miyabayashi | C09D 11/322 523/160 |

(Continued)

FOREIGN PATENT DOCUMENTS

| | | |
|---|---|---|
| EP | 0877065 A1 | 11/1998 |
| EP | 1914281 A1 | 4/2008 |
| EP | 2090627 A1 | 8/2009 |
| JP | 2004195706 A | 7/2004 |
| WO | 01/44326 A1 | 6/2001 |
| WO | 2008/042320 A1 | 4/2008 |
| WO | 2012/085541 A2 | 6/2012 |

(Continued)

OTHER PUBLICATIONS

Surfynol 465 MSDS from Air Products and Chemicals, Inc., Mar. 2008; 6 pages.*

*Primary Examiner* — Helene Klemanski
(74) *Attorney, Agent, or Firm* — Banner & Witcoff, Ltd.

(57) ABSTRACT

An ink comprising: (a) from 0.5 to 5 parts of a self-dispersible pigment; (b) from 1 to 10 parts of a styrene acrylic latex binder and/or styrene butadiene latex; (c) from 0 to 5 parts of a glycol selected from the group consisting of ethylene glycol, diethylene glycol, propylene glycol, dipropylene glycol or triethylene glycol; (d) from 1 to 10 parts of 2-pyrrolidone; (e) from 1 to 15 parts of glycerol; (f) from 0.1 to 3 parts of an acetylenic surfactant; (g) from 0.001 to 5 parts of biocide; (h) from 0 to 10 parts of a viscosity modifier; and (i) the balance to 100 parts water. Also an ink-jet printing process, a printed substrate, an ink-jet printer ink container and an ink-jet printer with a re-circulating printer head.

14 Claims, No Drawings

(56) References Cited

U.S. PATENT DOCUMENTS

| | | |
|---|---|---|
| 7,497,563 B2 | 3/2009 | Rehman |
| 7,578,876 B2 | 8/2009 | Nakajima et al. |
| 7,686,444 B2 | 3/2010 | Sugimoto et al. |
| 7,714,076 B2 | 5/2010 | Krepski et al. |
| 7,717,993 B2 | 5/2010 | Kanaya |
| 7,812,068 B2 | 10/2010 | Habashi et al. |
| 7,850,774 B2 | 12/2010 | Oriakhi |
| 7,922,316 B2 | 4/2011 | Bannai et al. |
| 7,955,426 B2 | 6/2011 | Kanaya |
| 8,114,923 B2 | 2/2012 | Sarkisian et al. |
| 8,142,558 B2 | 3/2012 | Robertson et al. |
| 8,142,559 B2 | 3/2012 | Robertson et al. |
| 8,182,597 B2 | 5/2012 | Robertson et al. |
| 8,187,371 B2 | 5/2012 | Brust et al. |
| 8,282,197 B2 | 10/2012 | De Voeght et al. |
| 8,287,112 B2 | 10/2012 | Van Thillo et al. |
| 8,398,199 B2 | 3/2013 | Verdonck |
| 8,403,461 B2 | 3/2013 | Hara et al. |
| 8,414,695 B2 | 4/2013 | Robertson et al. |
| 8,434,857 B2 | 5/2013 | Falkner et al. |
| 8,466,213 B2 | 6/2013 | Ueno et al. |
| 8,480,203 B2 | 7/2013 | Van Thillo et al. |
| 8,529,049 B2 | 9/2013 | De Voeght et al. |
| 8,632,630 B2 | 1/2014 | Robertson et al. |
| 8,690,308 B2 | 4/2014 | Boris et al. |
| 8,757,789 B2 | 6/2014 | Van Thillo et al. |
| 8,979,256 B2 | 3/2015 | Verdonck |
| 9,004,663 B2 | 4/2015 | Van Thillo et al. |
| 9,039,824 B2 | 5/2015 | Robertson et al. |
| 9,074,103 B2 | 7/2015 | Flores et al. |
| 9,090,734 B2 | 7/2015 | Kraiter et al. |
| 9,127,178 B2 | 9/2015 | Cordwell et al. |
| 9,187,665 B2 | 11/2015 | Vasudevan et al. |
| 9,187,667 B2 | 11/2015 | Doumaux et al. |
| 9,267,044 B2 | 2/2016 | Annable et al. |
| 9,309,425 B2 | 4/2016 | Popat et al. |
| 2005/0282946 A1 | 12/2005 | Lin et al. |
| 2007/0060670 A1 | 3/2007 | Ellis |
| 2008/0002004 A1 | 1/2008 | O'Donnell et al. |
| 2012/0274685 A1* | 11/2012 | Mis ............... B41J 2/18 347/9 |
| 2013/0197144 A1 | 8/2013 | Katoh et al. |
| 2014/0165874 A1 | 6/2014 | Robertson et al. |
| 2015/0368488 A1* | 12/2015 | Robello ............ B41J 2/18 524/560 |
| 2016/0032119 A1* | 2/2016 | Morris ............ C09C 1/48 428/207 |
| 2016/0083598 A1 | 3/2016 | Oriakhi |
| 2017/0362450 A1* | 12/2017 | Oriakhi ............ C09D 11/102 |
| 2018/0223119 A1* | 8/2018 | Oriakhi ............ C09D 11/326 |
| 2018/0237650 A1* | 8/2018 | Oriakhi ............ C09D 11/38 |

FOREIGN PATENT DOCUMENTS

| | | |
|---|---|---|
| WO | WO 2014/147373 A2 * | 9/2014 |
| WO | WO 2014/147374 A1 * | 9/2014 |

\* cited by examiner

INKS

RELATED APPLICATIONS

This application is a National Stage Application under 35 U.S.C. 371 of co-pending PCT application PCT/GB2015/053782 designating the United States and filed Dec. 10, 2015; which claims the benefit of U.S. provisional application No. 62/090,926 and filed Dec. 12, 2014 each of which are hereby incorporated by reference in their entireties.

This invention relates to inks, a process for ink-jet printing, ink-jet ink containers, ink sets and ink-jet printers.

Ink-jet printing is a non-impact printing technique in which droplets of an ink are ejected through fine nozzles onto a substrate without bringing the nozzles into contact with the substrate. There are basically three types of ink-jet printing:

i) Continuous ink-jet printing uses a pressurized ink source that produces a continuous stream of ink droplets from a nozzle. The droplets of ink are directed either thermally or by electrostatic means at a nominally constant distance from the nozzle. Those droplets which are not successfully deflected are recycled to the ink reservoir via a gutter.

ii) Drop-on-demand ink-jet printing where the ink is stored in a cartridge and fired from the print-head nozzle using a pressurization actuator (usually thermal or piezoelectric). With drop-on-demand printing only the drops that are required for printing are produced.

iii) Re-circulating ink-jet printing where the ink is continuously re-circulated in the print-head and (as in drop-on demand printing) only drops required for printing are drawn off to the nozzle.

Each of these types of ink-jet printing presents unique challenges. Thus, in continuous ink-jet printing ink active solvent monitoring and regulation is required to counter solvent evaporation during the time of flight of droplets which are ejected from the nozzle, but which do not give rise to a printed image (i.e. the time between nozzle ejection and gutter recycling), and from the venting process whereby excess air (drawn into the reservoir when recycling unused drops) is removed.

In drop-on demand printing the ink may be kept in the cartridge for long periods when it can deteriorate and form precipitates which can, in use, block the fine nozzles in the print-head. This problem is particularly acute with pigment inks where the suspended pigment particles can settle out.

Re-circulating ink-jet printing avoids these problems. Since the ink is constantly circulating it lessens the chance of the pigment settling and as the ink is only removed to the nozzle as required to form an image solvent evaporation is minimised.

Re-circulating ink-jet printers have found particular utility in the industrial sector. Industrial ink-jet printers are required to work at high speeds. Optimally a print-head for an industrial ink-jet printer will have multiple nozzles arranged at a high density to enable high productivity single-pass printing with acceptable print resolutions.

Ink formulation for all forms of ink-jet printing is extremely demanding. It is especially difficult to formulate inks able to work in these high speed single pass print-heads. To enable these printers to work at these high speeds the inks used must show a low foaming potential and excellent drop formation Thus, the present invention provides pigment inks formulated so as to:

(i) not cause nozzle blockage in a re-circulating head;
(ii) allow fast drying by being more volatile than standard ink-jet inks. This is essential in an industrial process since it enables high production speeds with low energy consumption (i.e. low temperature printing);
(iii) give high quality images, comparable to flexographic printing, of high durability by incorporating a carefully selected latex and by optimising the ink vehicle design;
(iv) be sufficiently stable and robust so that it can be used in a continuous industrial environment.
(v) not cause foaming.
(vi) not cause face-plate wetting in the print-head.

The wetting capability of a liquid is a function of its surface tension relative to the surface energy of the solid surface. Thus, if the molecules of the liquid have a stronger attraction to the molecules of the solid surface than to each other (the adhesive forces are stronger than the cohesive forces), wetting of the surface occurs. However, if the molecules in the liquid are more strongly attracted to each other than the molecules of the solid surface (the cohesive forces are stronger than the adhesive forces), the liquid beads-up and does not wet the surface. The degree of wetting of a liquid on a particular surface may be determined by measuring the contact angle of a drop of the liquid placed on the surface. A liquid is said to wet a surface when the contact angle is less than 90 degrees. The lower the contact angle the greater the degree of wetting.

It is challenging to design a volatile ink containing a low film-forming temperature latex (as required in (ii) and (iii)) which does not foam and which does not wet the face plate of the print-head.

Therefore, according to a first aspect of the present invention there is provided an ink comprising:
(a) from 0.5 to 5 parts of a self-dispersible pigment;
(b) from 1 to 10 parts of a styrene acrylic latex binder and/or a styrene butadiene latex binder;
(c) from 0 to 5 parts of a glycol selected from the group consisting of ethylene glycol, diethylene glycol, propylene glycol, dipropylene glycol or triethylene glycol;
(d) from 1 to 10 parts of 2-pyrrolidone;
(e) from 1 to 15 parts of glycerol;
(f) from 0.1 to 3 parts of an acetylenic surfactant;
(g) from 0.001 to 5 parts of biocide;
(h) from 0 to 10 parts of a viscosity modifier; and the balance to 100 parts water.

All parts and percentages herein (unless stated otherwise) are by weight.

A "self-dispersible pigment" is a pigment preparation which is able to freely, rapidly and permanently disperse when added to a liquid medium. If the pigment carries a charged group on its surface (either directly or via the associated polymeric dispersant) then it preferably has a counter ion.

The self-dispersible pigment is preferably derived from any of the classes of pigments described in the Third Edition of the Colour Index (1971) and subsequent revisions of, and supplements thereto, under the chapter headed "Pigments".

Examples of suitable organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although often regarded as being inorganic, behaves more like an organic pigment in its dispersing properties and is also suitable. Preferred organic pigments are phthalocyanines, especially copper phthalocyanine pigments, azo pigments, indanthrones, anthanthrones, quinacridones and carbon black pigments.

The pigment is preferably a yellow, cyan, magenta, or black pigment. The pigment may be a single chemical species or a mixture comprising two or more chemical species (e.g. a mixture comprising two or more different pigments). In other words, two or more different pigments solids may be used in the process of the present invention.

More preferably the self-dispersible pigment is selected from the group consisting of Carbon Black; Pigment Blue 15:3; Pigment Blue 60; Pigment Yellow 74; Pigment Yellow 155; Pigment Red 254 and Pigment Red 122.

The pigment in the self-dispersible pigment may be dispersed by any means known in the art. This may involve coating the surface of the pigment with a suitable dispersant or mixture thereof. The dispersant may be anionic, cationic or non-ionic, and may comprise a random, block or comb polymer. Suitable dispersants include but are not limited to poly(meth)acrylates, polyurethanes, polyesters and polyethers.

Other preferred self-dispersible pigments may be prepared by chemically modifying the surface of the pigment. This is particularly preferred for carbon black where the pigment surface may be oxidised to render the carbon black water dispersible. Suitable oxidants include air, hydrogen peroxide, hypochlorites, nitric acid, nitrogen dioxide, ozone and persulfates.

Thus, in one preferred embodiment of the present invention the self-dispersible pigment is a carbon black whose surface has been oxidised.

Organic pigments may also have charged groups introduced onto their surface using either reagents specific to that particular class/type of pigment or more general reactions such as sulfonation.

Alternately the self-dispersible pigment may have a charged group or polymeric dispersant chemically covalently attached to its surface.

Thus, for example, carbon black is able to react with diazonium salts. This allows the introduction of a specific charged group onto the surface of the carbon black. A phenyl spacer group is commonly used with the charged/dispersing group being bound to the phenyl. Examples of such charged groups are sulfonate, carboxyl, phosphonate and biphosphonate. It is also possible using diazonium chemistry to introduce a range of polymeric dispersants to the surface of carbon black.

Certain organic pigments may also have charged groups and polymeric dispersants introduced on to their surface via diazonium chemistry. The dispersants attached to the surface of the self dispersible pigments may be of any type known a skilled person. Dispersants may be of general applicability or designed for use with a specific pigment.

In a preferred embodiment of the invention the self-dispersible pigment is a pigment with a charged group or polymeric dispersant covalently attached to the surface of the pigment by means of a diazonium compound.

One preferred form of dispersant is a diblock copolymer A-B or a triblock copolymer A-B-A where block B has an affinity for the pigment and block A is responsible for colloidal stabilisation. With organic pigments it is possible to synthesise a specific pigment comprising such a dispersant rather than attaching the dispersant to the pigment in a post synthetic step.

It is preferred that in component (a) the self-dispersible pigment comprises a dispersant crosslinked around a pigment.

In one particularly preferred embodiment in component (a) the self-dispersible pigment comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups, especially two or more epoxy groups.

The dispersant, prior to crosslinking with the crosslinking agent, preferably has an acid value of at least 125 mg KOH/g.

The dispersant preferably has one or more oligomeric dispersing groups.

In order to provide water-dispersibility, the polymer-encapsulated pigment particles preferably have carboxy groups (i.e. not all of the carboxy groups in the dispersant are crosslinked to form the polymer-encapsulated pigment particles).

The polymer-encapsulated pigment particles may be prepared by crosslinking some of the carboxy groups in a carboxy-functional dispersant in the presence of a pigment and a crosslinking agent, preferably at a temperature of less than 100° C. and/or a pH of at least 6. Such crosslinking is usually performed in an aqueous medium, for example in a mixture comprising water and organic solvent. Suitable mixtures comprising water and organic solvent are as described above in relation to the ink.

Preferably, the polymer-encapsulated pigment particles have a Z-average particle size of less than 500 nm, more preferably from 10 to 400 nm and especially from 15 to 300 nm.

The Z-average particle size may be measured by any means, but a preferred method is by photo correlation spectroscopy devices available from Malvern® or Coulter®.

Suitable methods for making the polymer-encapsulated pigment particles are described in WO2006/064193 and WO2010/038071. In essence, a dispersant having carboxy groups is adsorbed onto a pigment and then some (but not all) of the carboxy groups are crosslinked to give a pigment dispersion where the pigment is permanently trapped within the crosslinked dispersant. Such particles may be obtained commercially from FUJIFILM Imaging Colorants Limited.

Preferably the carboxy-functional dispersants comprise benzyl methacrylate.

A preferred carboxy-functional dispersant is a copolymer comprising one or more hydrophobic ethylenically unsaturated monomers (preferably at least half of which by weight is benzyl methacrylate), one or more hydrophilic ethylenically unsaturated monomers having one or more carboxy groups; and optionally some or no hydrophilic ethylenically unsaturated monomers having one or more hydrophilic non-ionic groups.

An especially preferred carboxy-functional dispersant is a copolymer comprising:
(i) from 75 to 97 parts of one or more hydrophobic ethylenically unsaturated monomers comprising at least 50 parts of benzyl methacrylate;
(ii) from 3 to 25 parts of one or more hydrophilic ethylenically unsaturated monomers having one or more carboxy groups; and
(iii) 0 to 1 part of hydrophilic ethylenically unsaturated monomers having one or more hydrophilic non-ionic groups;
wherein the parts are by weight.

Typically and the sum of the parts (i), (ii) and (iii) adds up to 100.

It is preferred that the only hydrophobic ethylenically unsaturated monomer in component (i) is benzyl methacylate.

More preferably the carboxy-functional dispersant is a copolymer comprising:
(i) from 80 to 93 parts of one or more hydrophobic ethylenically unsaturated monomers comprising at least 50 parts benzyl methacrylate;
(ii) from 7 to 20 parts of one or more hydrophilic ethylenically unsaturated monomers having one or more carboxy groups;
(iii) 0 to 1 part of hydrophilic ethylenically unsaturated monomers having a hydrophilic non-ionic group;
wherein the parts are by weight.

Typically and the sum of the parts (i), (ii) and (iii) adds up to 100.

Preferably the hydrophobic monomers have no hydrophilic groups, whether ionic or non-ionic. For example, they are preferably free from water-dispersing groups.

Preferably, the hydrophobic ethylenically unsaturated monomers have a calculated log P value of at least 1, more preferably from 1 to 6, especially from 2 to 6.

A review by Mannhold, R. and Dross, K. (Quant. Struct-Act. Relat. 15, 403-409, 1996) describes how to calculate log P values.

Preferred hydrophobic ethylenically unsaturated monomers are styrenic monomers (e.g. styrene and alpha methyl styrene), aromatic (meth)acrylates (especially benzyl (meth)acrylate), $C_{1-30}$-hydrocarbyl (meth)acrylates, butadiene, (meth)acrylates containing poly($C_{3-4}$ alkylene oxide groups, (meth)acrylates containing alkylsiloxane or fluorinated alkyl groups and vinyl naphthalene.

Preferably, the dispersant comprises the repeat units from copolymerising from 75 to 97, more preferably from 77 to 97, especially from 80 to 93 and most especially from 82 to 91 parts by weight of component (i).

Dispersants comprising at least 50 parts of benzyl (meth)acrylate monomer repeat units can provide polymer-encapsulated pigment dispersions with good stability and good optical density.

Component (i) preferably comprises at least 60 parts, more preferably at least 70 and especially at least 75 parts by weight of benzyl (meth)acylate. The remainder required to obtain the overall preferred amounts of hydrophobic monomers may be provided by any one or more of the above hydrophobic monomers other than benzyl (meth)acrylate. Preferably, benzyl (meth)acrylate is benzyl methacrylate (rather than benzyl acrylate).

In a preferred embodiment component (i) comprises only benzyl (meth)acrylate, more preferably only benzyl methacrylate.

Preferably, the monomers in component (ii) have a calculated log p value of less than 1, more preferably from 0.99 to −2, especially from 0.99 to 0 and most especially from 0.99 to 0.5, when calculated in the un-neutralised (e.g. free acid) form.

Preferred hydrophilic ethylenically unsaturated monomers for component (ii) having one or more carboxylic acid groups include beta carboxyl ethyl acrylate, itaconic acid, maleic acid, fumaric acid, crotonic acid, more preferably acrylic acid and especially methacrylic acid. Preferably, these ethylenically unsaturated monomers when polymerised provide the only ionic groups in the dispersant.

In a preferred embodiment component (ii) is or comprises methacrylic acid.

Preferably, the dispersant comprises the repeat units from copolymerising 3 to 25, more preferably 3 to 23, especially 7 to 20 and most especially 9 to 18 parts by weight of component (ii). This is especially so when component (ii) comprises, or more preferably is, methacrylic acid.

For the purposes of the present invention a monomer having both ionic and non-ionic hydrophilic groups is considered to belong to component (iii). Thus, all the ethylenically unsaturated monomers in component (ii) are free from hydrophilic non-ionic groups.

Preferably, the monomers in component (iii) have calculated log P values of less than 1, more preferably from 0.99 to −2.

Preferably, component (iii) is less than 1 part, more preferably less than 0.5 parts, especially less than 0.1 parts and most especially 0 parts (i.e. absent). In this way the dispersant contains no repeat units from hydrophilic monomers having one or more hydrophilic non-ionic groups.

Examples of hydrophilic non-ionic groups include polyethyleneoxy, polyacrylamide, polyvinyl pyrrolidone, hydroxy functional celluloses and poly vinyl alcohol. The most common ethylenically unsaturated monomer having a hydrophilic non-ionic group is polyethyleneoxy (meth)acrylate.

In embodiments where repeat units from component (iii) are present in the dispersant (for example 1 part by weight of component (iii)) then in one embodiment the amount of component (iii) is deducted from the preferred amounts of component (i). In this way the amounts of all the components (i), (ii) and (iii) still adds up to 100. Thus for embodiments where 1 part by weight of component (iii) is present the preferred amounts of component (i) expressed above would become from 74 to 96 (75-1 to 97-1), more preferably from 76 to 96 (77-1 to 97-1), especially from 79 to 92 (80-1 to 93-1) and most especially from 81 to 90 (82-1 to 91-1) parts by weight of component (i). In an another embodiment it is possible to deduct the amount of component (iii) from the preferred amounts of component (ii) so that again the sum of the amounts of components (i), (ii) and (III) adds up to 100 parts by weight.

The function of the carboxylic acid group(s) in the dispersant is primarily to cross-link with the crosslinking agent and to provide the subsequent polymer-encapsulated pigment particles with the ability to disperse in aqueous ink media. Where carboxylic acid group(s) are the only groups for stabilising the polymer-encapsulated pigment particles in the aqueous medium it is preferable to have a molar excess of carboxylic acid groups to carboxy-reactive groups (e.g. epoxy groups) in the crosslinking agent to ensure that unreacted carboxylic acid groups remain after the crosslinking reaction has been completed. In one embodiment the ratio of moles of carboxylic acid groups to moles of carboxy-reactive groups (e.g. epoxy groups) in the crosslinking agent is preferably from 10:1 to 1.1:1, more preferably from 5:1 to 1.1:1 and especially preferably from 3:1 to 1.1:1.

The dispersant may optionally have other stabilising groups. The choice of the stabilising groups as well as the amounts of such groups will depend to a large extent on the nature of the aqueous medium.

In embodiments where the crosslinking agent has one or more oligomeric dispersing group the dispersant preferably has an acid value of at least 125 mg KOH/g.

The acid value of the dispersant, prior to crosslinking with the crosslinking agent, is preferably from 130 to 320 and more preferably from 135 to 250 mg KOH/g. We have found that dispersants having such acid values provide resultant polymer-encapsulated pigment particles which exhibit good stability in aqueous inks and also have sufficient carboxy groups for subsequent crosslinking with the crosslinking agent. Preferably, the dispersant (prior to crosslinking) has a number average molecular weight of from 500 to 100,000, more preferably from 1,000 to 50,000 and especially from 1,000 to 35,000. The molecular weight may be measured by gel permeation chromatography.

The dispersant need not be totally soluble in the liquid medium used to make the polymer-encapsulated pigment particles. That is to say perfectly clear and non-scattering solutions are not essential. The dispersant may aggregate in surfactant-like micelles giving slightly hazy solutions in the liquid medium. The dispersant may be such that some proportion of the dispersant tends to form a colloid or micellar phase. It is preferred that the dispersant produces uniform and stable dispersions in the liquid medium used to make the polymer-encapsulated pigment particles which do not settle or separate on standing.

It is preferred that the dispersant is substantially soluble in the liquid medium used to make the polymer-encapsulated pigment particles, giving rise to clear or hazy solutions.

Preferred random polymeric dispersants tend to give clear compositions whilst less preferred polymeric dispersants with two or more segments tend to give rise to the aforementioned hazy compositions in liquid media.

Typically the dispersant adsorbs onto the pigment prior to crosslinking so as to form a relatively stable dispersion of the pigment particles. This dispersion is then crosslinked using the crosslinking agent to form the polymer-encapsulated pigment particles. This pre-adsorption and pre-stabilisation in particular distinguishes the present invention from coacervation approaches whereby a polymer or pre-polymer (which is not a dispersant) is mixed with a particulate solid, a liquid medium and the crosslinking agent and only during or after crosslinking does the resultant cross-linked polymer precipitate onto the particulate solid.

In embodiments where the dispersant has an acid value of at least 125 mg KOH/g the crosslinking agent may have no oligomeric dispersing groups, but preferably the crosslinking agent has one or more oligomeric dispersing groups.

Crosslinking agents having one or more oligomeric dispersing group increase the stability of the polymer-encapsulated pigment particles in the ink.

The oligomeric dispersing group preferably is or comprises polyalkyleneoxide, more preferably a polyC$_{2-4}$-alkyleneoxide and especially a polyethyleneoxide. The polyalkyleneoxide groups provide steric stabilisation which improves the stability of the resulting encapsulated particulate solid.

Preferably the polyalkyleneoxide contains from 3 to 200, more preferably from 5 to 50 alkyleneoxide and especially from 5 to 20 alkyleneoxide repeat units.

The crosslinking agent preferably has at least two epoxy groups.

Preferred crosslinking agents having two epoxy groups and zero oligomeric dispersing groups are ethylene glycol diglycidyl ether, resorcinol diglycidyl ether, neopentyl glycol diglycidyl ether, 1,6-hexanediol diglycidyl ether, hydrogenated bisphenol A diglycidyl ether and polybutadiene diglycidyl ether.

Preferred crosslinking agents having two epoxy groups and one or more oligomeric dispersing groups are diethylene glycol diglycidyl ether, poly ethylene glycol diglycidyl ether, dipropylene glycol diglycidyl ether and poly propylene glycol diglycidyl ether.

Preferred crosslinking agents having three or more epoxy groups and zero oligomeric dispersing groups are sorbitol polyglycidyl ether, polyglycerol polyglycidyl ether, pentaerythritol polyglycidyl ether, diglycerol polyglycidyl ether, glycerol poly glycidyl ether and trimethylolpropane polyglycidyl ether.

In one embodiment the epoxy crosslinking agent has zero oligomeric dispersing groups.

Examples of oxetane crosslinking agents include 1,4-bis[(3-ethyl-3-oxetanylmethoxymethyl)]benzene, 4,4'-bis[(3-ethyl-3-oxetanyl)methoxy]benzene, 1,4-bis[(3-ethyl-3-oxetanyl)methoxyl-benzene, 1,2-bis[(3-ethyl-3-oxetanyl)-methoxy]benzene, 4,4-bis[(3-ethyl-3-oxetanyl)methoxy]biphenyl and 3,3',5,5'-tetramethyl-[4,4'-bis(3-ethyl-3-oxetanyl)methoxy]biphenyl.

Examples of carbodiimide crosslinking agents include crosslinker CX-300 from DSM NeoResins. Carbodiimide crosslinking agents having good solubility or dispersibility in water may also be prepared as described in U.S. Pat. No. 6,124,398, synthetic Examples 1 to 93.

Examples of isocyanate crosslinking agents include isophorone diisocyanate, hexamethylene diisocyanate, toluene diisocyanate, methylene diphenyl diisocyanate, methylene dicyclohexyl diisocyante, 2-methyl-1,5-pentane diisocyanate, 2,2,4-trimethyl-1,6-hexane diisocyante and 1,12-dodecane diisocyanate, 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl)-methane, hexamethylene diisocyanate, 1,2-bis-(isocyanatomethyl)-cyclobutane, 1,3- and 1,4-bis-(isocyanatomethyl)cyclohexane, hexahydro-2,4- and/or -2,6-diisocyanatoluene, 1-isocyanato-2-isocyanatomethyl cyclopentane, 1-isocyanato-3-isocyanatomethyl-3,5,5-trimethyl-cyclohexane, 2,4'-dicyclohexylmethane diisocyanate, and 1-isocyanato-4(3)-isocyanatomethyl-1-methyl cyclohexane, tetramethyl-1,3- and/or -1,4-xylylene diisocyanate, 1,3- and/or 1,4-phenylene diisocyanate, 2,4- and/or 2,6-toluene diisocyanate, 2,4- and/or 4,4'-diphenyl-methane diisocyanate, 1,5-diisocyanatonaphthalene, and p-xylylene diisocyanate. Suitable diisocyanates are also understood to include those containing modification groups such as biuret, uretdione, isocyanurate, allophanate and/or carbodiimide groups, as long as they contain two or more isocyanate groups. For isocyanates the liquid medium is preferably non-aqueous, although water can sometimes be tolerated with blocked isocyanates.

In a preferred embodiment, the polyisocyanate crosslinking agent contains three isocyanate groups. A convenient source of triisocyanate functional compounds is the known isocyanurate derivative of diisocyanates. Isocyanurate derivatives of diisocyanates can be made by reacting the diisocyanate together with a suitable trimerization catalyst. An isocyanurate derivative is produced that contains an isocyanurate core with pendant organic chains terminated by three isocyanate groups. Several isocyanurate derivatives of diisocyanates are commercially available. In one preferred embodiment, the isocyanurate used is the isocyanurate of isophorone diisocyanate. In another preferred embodiment, the isocyanaurate of hexamethylene diisocyanate is used.

Examples of N-methyol crosslinking agents include dimethoxydihydroxy ethylene urea; N,N-dimethylol ethyl carbamate; tetramethylol acetylene diurea; dimethylol urone; dimethylol ethylene urea; dimethylol propylene urea; dimethylol adipic amide; and mixtures comprising two or more thereof.

Examples of keteneimine crosslinking agents include compounds of formula $Ph_2C=C=N-C_6H_4-N=C=CPh_2$ wherein each Ph independently is an optionally substituted phenyl group.

Examples of hydrazide crosslinking agents include malonic dihydrazide, ethylmalonic dihydrazide, succinic dihydrazide, glutaric dihydrazide, adipic dihydrazide, isophthalic dihydrazide, oxalyl dihydrazide and pimelic dihydrazide.

Commercially available highly reactive oxazoline crosslinking agents are available from, for example, Nippon Shokubai under the Epocross® trade mark. These include the emulsion type (e.g. the Epocross K-2000 Series, such as K-2010E, K-2020E and K-2030E) and the water-soluble types (e.g. the Epocross WS Series, such as WS-300, WS-500 and WS-700).

Examples of aziridine crosslinking agents include ethylene imine-based polyaziridines (e.g. PZ-28 and PZ-33 available from PolyAziridine LLC, Medford, N.J.); XC-103 tri-functional aziridines, XC-105 polyfunctional aziridines and Crosslinker XC-113 (available from Shanghai Zealchem Co., Ltd., China); polyfunctional aziridine liquid crosslinker SaC-100 (available from Shanghai UN Chemical Co., Ltd, China); The aziridines crosslinking agents disclosed in WO 2009/120420; NeoCryl® CX-100 (available from DSM NeoResins); Xama® polyfunctional aziridines (available from Lubrizol); trimethylolpropane tris(beta-aziridino)propionate, neopentylglycol di(beta-aziridino)propionate, glyceryl tris(beta-aziridino)propionate, pentaerythrityltetra(beta-aziridino)propionate, 4,4'-isopropylidenediphenol di(beta-aziridino)propionate, 4,4'-methylenediphenol di(beta-aziridino); and mixtures comprising two or more thereof.

Particularly preferred crosslinking agents are polyethylene glycol diglycidyl ether (e.g. having an average molecular weight 526, obtainable from Aldrich) and/or trimethylolpropane polyglycidyl ether (e.g. Denacol® EX-321, obtainable from Nagase Chemtex, with weight per epoxy of 140).

Preferably component (a) is present in the range of from 0.75 to 4 parts and more preferably from 1 to 3 parts.

The ink may contain more than one styrene acrylic latex binder and/or a styrene butadiene latex binder (component (b)). The latex binders may differ in their properties, such as particle size, glass transition temperature or molecular weight.

However, the styrene acrylic latex binder and/or a styrene butadiene latex binder is preferably either a styrene acrylic latex binder or a styrene butadiene latex binder. More preferably component (b) is a styrene butadiene latex binder.

Preferably the styrene acrylic latex binder has a Tg in the range of from –30° C. to 50° C., more preferably in the range of from 0° C. to 40° C. and especially in the range of from 10° C. to 30° C.

Preferably the styrene butadiene latex binder has a Tg in the range of from 0° C. to 120° C., more preferably in the range of from 10° C. to 110° C. and especially in the range of from 50° C. to 90° C.

The Tg is determined by Differential Scanning Calorimetry on the dried latex. The Tg is taken as being the midpoint value from a re-heat Differential Scanning Calorimetry scan (i.e. after an initial heat and cool).

It is preferred that the styrene acrylic latex has an acid value in the range of from 5 to 100 mgKOH/g and more preferably in the range of from 30 to 70 mg KOH/g.

Preferably the styrene acrylic latex binder and/or a styrene butadiene latex binder are prepared by emulsion polymerisation.

The molecular weight of the styrene acrylic latex binder and styrene butadiene latex binders can be controlled by methods known in the art, for example, by use of a chain transfer agent (e.g. a mercaptan) and/or by control of initiator concentration in the case of emulsion polymerisation, and/or by heating time. Preferably the styrene acrylic latex binder and styrene butadiene latex binders have a molecular weight of greater than 20,000 Daltons and more preferably of greater than 100,000 Daltons. It is especially preferred that the molecular weight of the styrene acrylic latex binder and styrene butadiene latex binders is greater than 200,000 to 500,000 Daltons.

The styrene acrylic latex binder and styrene butadiene latex binders may be monomodal, preferably with an average particle size of below 1000 nm, more preferably below 200 nm and especially below 150 nm. Preferably, the average particle size of the styrene acrylic latex binder and styrene butadiene latex binders is at least 20 nm, more preferably at least 50 nm. Thus, the styrene acrylic latex binder and styrene butadiene latex binders may preferably have an average particle size in the range of from 20 to 200 nm and more preferably in the range of from 50 to 150 nm. The average particle size of the styrene acrylic latex binder and styrene butadiene latex binders may be measured using photon correlation spectroscopy The styrene acrylic latex binder and styrene butadiene latex binders may also show a bimodal particle size distribution. This may be achieved either by mixing two or more latexes of different particle size, or by generating the bimodal distribution directly, for example by two-stage polymerisation. Where a bimodal particle size distribution is used it is preferred that the lower particle size peak is in the range 20-80 nm, and the higher particle size peak is in the range 100-500 nm. It is further preferred that the ratio of the two particle sizes is at least 2, more preferably at least 3 and most preferably at least 5.

The molecular weight of the styrene acrylic latex binder and styrene butadiene latex binders may be determined by Gel Permeation Chromatography against polystyrene standards using an Agilent HP1100 instrument with THF as eluent and PL Mixed Gel C columns.

The styrene acrylic latex binder and styrene butadiene latex binders once formed is preferably screened to remove oversized particles prior to use, for example through a filter having an average pore size below 3 µm, preferably 0.3 to 2 µm, especially 0.5 to 1.5 µm. The styrene acrylic latex binder and styrene butadiene latex binders may be screened before, during or after it is mixed with other components to form the ink.

Commercially available styrene acrylic latex binder and styrene butadiene latex binders may be used in the ink according to the present invention.

Examples of commercially available styrene acrylic latexes which can be used in the ink of the pre present invention include styrene acrylic latexes in the Rovene® range supplied by Mallard Creek polymers, particularly Rovene 6102 Rovene 6112 and Rovene 6103 and styrene butadiene latexes such as Rovene 5499 and Rovene 4111 and especially Rovene 6102.

The latex binder plays a key role in the improved adhesion seen with the inks of the present invention when applied to low surface energy substrates and to the durability of the print in wet and oily conditions.

Component (b) is preferably in the range of from 5 to 8 parts.

Component (c) is preferably either ethylene glycol or triethylene glycol.

Component (c) is preferably present in the range of from 0.5 to 2.5 parts and more preferably in the range of from 0.75 to 2.0 parts.

Component (d) is preferably present in the range of from 2.5 to 7.5 parts.

Component (e) is preferably present in the range of from 2 to 7.5 parts.

Any acetylenic surfactant may be used as component (f). However, 2,4,7,9-tetramethyl-5-decyne-4,7-diol and ethylene oxide condensates thereof and 2,5,8,11-tetramethyl-6-dodecyne-5,8-diol and ethylene oxide condensates thereof are preferred.

It is particularly preferred that the acetylenic surfactant is 4,7,9-tetramethyl-5-decyne-4,7-diol or ethylene oxide condensates thereof. It is especially preferred that the acetylenic surfactant is 4,7,9-tetramethyl-5-decyne-4,7-diol. The surfactants 2,4,7,9-tetramethyl-5-decyne-4,7-diol and ethylene oxide condensates thereof are available as the Surfynol® range of surfactants from Air Products.

The preferred surfactant 2,4,7,9-tetramethyl-5-decyne-4,7-diol is commercially available as Surfynol® 440 from Air Products or as its ethoxylated analogue Surfynol® 465.

Mixtures containing different surfactants may be used.

Component (f) is preferably present in the composition in a range of from 0.001 to 2.5 parts, more preferably 0.01 to 1.5 parts, especially 0.05 to 1.0 parts, and more especially in a range of from 0.1 to 0.5 parts.

The surfactant is a key component in the inks of the present invention. Correct choice of both the surfactant and its concentration in a particular ink is essential in the ink-jetting effectively and in not wetting the face-plate of the print-head.

It is essential that the surfactant does not cause the ink to foam.

It is also desirable that the ink is designed so that it does not wet print-head face-plates that are not treated with a "non-wetting coating". These face-plates may show a contact angle with water of less than 90°, or less than 80°. Face-plates that are specifically designed to be non-wetting may have a contact angle with water of more than 90° C., sometimes more than 95°, and sometimes even more than 100°.

To achieve these properties it is desirable that the ink shows a dynamic surface tension range, i.e. that its surface tension is dependent on the surface age. The surface tension of a newly created surface is high, but drops as surfactant, or other surface active species, migrate to the surface. The dynamic surface tension range may be determined by measurements in a bubble tensiometer. This measures the surface tension as a function of surface age or bubble frequency. It is preferred that the surface tension measured at 10 ms ($\gamma(10)$) is >35 dynes/cm, and the surface tension measured at 1,000 ms ($\gamma(1000)$) is in the range 20 to 40 dynes/cm, with $\gamma(10)>\gamma(1000)$. Alternatively the equilibrium surface tension of the ink can be compared with that of the equivalent ink made without inclusion of the surfactant(s). It is preferred that the equilibrium surface tension without surfactant is at least 10 dynes/cm higher than that where the surfactant(s) is (or are) present.

For component (g) any biocide (or mixture of biocides) which is stable in the ink may be used. It is particularly preferred that the biocide comprises 1,2-benzisothazolin-3-one which is available as a 20% active solution from Lonza as Proxel® GXL and Bioban®, DXN (2,6-dimethyl-1,3-dioxan-4-yl acetate), from Dow Chemical Company.

The viscosity modifier, component (h), is preferably selected from the group consisting of polyethers, (such as polyethylene glycol and poly(ethylene oxide)), cellulose polymers such as hydroxyethyl cellulose, hydroxypropyl cellulose and carboxymethyl cellulose, water-soluble polyesters, homopolymers of 2-ethyl-oxazoline (e.g. poly-2-ethyl-2-oxazoline), poly(vinyl alcohol) and poly(vinylpyrrolidones) and mixtures thereof.

Component hi) is preferably poly(ethylene glycol) or poly(ethylene oxide).

More preferably component (h) is polyethylene glycol especially polyethylene glycol 20,000.

Component (h) is preferably present in the composition in an amount of from 3 to 8 parts.

The ink preferably has a MFFT below 65° C., especially below 60° C.

The MFFT is the lowest temperature at which components of the ink components will coalesce to form a film, e.g. during ink drying.

Equipment for measuring MFFT is commercially available, for example the Minimum Film Forming Temperature Bar is available from Rhopoint Instruments (the "MFFT Bar 90"). The MFFT Bar 90 comprises a temperature bar having a nickel-plated copper platen with an electronically imposed temperature gradient. Ten equally spaced sensors beneath the surface provide instantaneous temperature measurement along the bar. The desired temperature program is selected and the instrument allowed to reach thermal equilibrium. Tracks of wet test ink may be applied using a cube applicator, or spreader. Once the ink has dried the device shows the MFFT. If for any reason the above mentioned commercially available equipment does not work on the ink (e.g. due to a low latex content and/or the ink's colour), one may instead place a small amount of the ink in a dish and heat the dish containing the ink at the desired assessment temperature (e.g. 70° C.) for 24 hours and then rub the surface with a gloved finger to assess whether a film has formed. If a film has formed there will be little or no ink transfer to the gloved finger, whereas if a film has not formed there will be a significant transfer of ink to the gloved finger or the dried ink will crack.

The desired MFFT may be achieved by selecting appropriate combinations of polymer latex and organic solvents. If the MFFT of an ink is too high, the amount of coalescing solvent may be increased and/or a polymer latex of lower Tg may be used in order to bring the ink MFFT into the desired range. Therefore at the ink design stage one may decide whether to include more or less coalescing solvent and higher or lower Tg polymer latex, depending on the desired MFFT.

Typically one will select the ink and the substrate such that the ink has an MFFT below the temperature at which the substrate would deform, distort or melt. In this way, the ink can form a film on the substrate at a temperature which does not damage the substrate.

In a first preferred embodiment the viscosity of the ink at 32° C. is in the range of from 10 to 14 mPa s when measured using a Brookfield SC4-18 at 150 rpm.

In a second preferred embodiment the viscosity of the ink 1 at 32° C. is in the range of from 4 to 8 mPas when measured using a Brookfield SC4-18 at 150 rpm.

In the first preferred embodiment the ink has a surface tension of from 20 to 65 dynes/cm, more preferably of from 20 to 50 dynes/cm, especially of from 32 to 42 dynes/cm and more especially of from 34 to 38 dynes/cm, when measured at 25° C. using a Kruss K100 tensiometer.

In the second preferred embodiment the ink has a surface tension of from 20 to 65 dynes/cm, more preferably of from 20 to 50 dynes/cm and especially of from 30 to 40 dynes/cm, when measured at 25° C. using a Kruss K100 tensiometer Preferably, the ink composition has been filtered through a filter having a mean pore size of less than 10 microns, more preferably less than 5 microns and especially less than 1 micron.

Preferably the ink has a pH in the range of from 7.5 to 9.5. The pH may be adjusted by means of a suitable buffer.

In addition to the above mentioned components, the ink composition may optionally comprise one or more ink additives. Preferred additives suitable for ink-jet printing inks are anti-kogation agents, rheology modifiers, corrosion inhibitors and chelating agents. Preferably, the total amount of all such additives is no more than 10 parts by weight. These additives are added to and comprise part of component (i), the water added to the ink.

In one preferred embodiment the ink comprises:
(a') 0.75 to 4 parts of a self-dispersible pigment;
(b') 4 to 10 parts of a styrene acrylic latex binder;
(c') 0.5 to 2.5 parts of ethylene glycol;
(d') 2.5 to 7.5 parts of 2-pyrrolidone;
(e') 2 to 7.5 parts of glycerol;
(f') 0.05 to 1.0 parts of 2,4,7,9-tetramethyl-5-decyne-4,7-diol;
(g') 0.001 to 2 parts of biocide;
(h') 3 to 8 parts of a viscosity modifier;
(i') the balance to 100 parts water.

In a second preferred embodiment the ink of the present inventions lacks a glycol. That is, component (c) is zero.

Although the present invention is of particular value for printing substrates which are non-absorbent and/or temperature-sensitive, it may also be used to print substrates which are absorbent and/or not temperature-sensitive. For such substrates the present inks and processes offer the advantage of providing prints having good rub-fastness properties at lower temperatures than used in prior processes, thereby reducing manufacturing costs.

Examples of non-absorbent substrates include polyester, polyurethane, bakelite, poly vinyl chloride, nylon, polymethyl methacrylate, polyethylene terephthalate, polypropylene, acrylonitrile-butadiene-styrene, polycarbonate, a blend of about 50% polycarbonate and about 50% acrylonitrile-butadiene-styrene, polybutylene terephthalate, rubber, glass, ceramic and metal.

In one embodiment it is especially preferred that the inks of the present invention are used to print on a substrate which comprises a low density polyethylene film.

In another preferred embodiment the ink is preferably used to print a substrate which comprises a spunbond film laminate, especially a polypropylene based spunbond film laminate.

It is particularly preferred that the ink is used to print non-woven wipes preferably comprising polypropylene and more preferably comprising a polypropylene based spunbond film laminate.

If desired the substrate may be pre-treated in order to enhance adhesion of the ink thereto, e.g. using plasma, corona discharge or surfactant treatment. For example the substrate may be roughened, or it may be coated with an ink receptive coating.

In one embodiment the process further comprises drying the ink applied to the substrate at a temperature of at most 70° C., more preferably of at most 65° C. and especially of at most 60° C.

A second aspect of the invention provides an ink-jet printing process wherein the ink according to the first aspect of the invention is printed onto a substrate by means of an ink jet printer. Preferably in the second aspect of the invention the ink according to the first aspect of the invention is printed onto a substrate using an ink-jet printer with an ink re-circulating print-head.

The process of the present invention may use any ink-jet printer with an ink re-circulating print-head. Preferably the print-head has an ink re-circulation channel in the ink supply system. This channel allows for fresh ink to be available for jetting and can be part of the ink supply system or even specially engineered channels which run behind the nozzle plate. It is preferred that the ink supply system runs behind the nozzle plate as this allows for the use of more volatile inks whilst not compromising restart/latency behaviour. Behind nozzle plate re-circulation is exemplified in commercially available FUJIFILM Dimatix print-heads such as Samba® or SG1024®.

Recirculating print-heads of the type preferred in the present invention are usually equipped with a reservoir heater and a thermistor to control the jetting temperature. Preferably in step (III) the jetting temperature is in excess of 30° C.

Preferably the drop volume of the ink applied by the ink-jet printer is in the range of from 1 to 100 pl.

When the ink of the first preferred embodiment, as described above in step (I) is jetted the drop volume of the ink applied by the ink-jet printer is preferably in the range of from 20 to 100 pl and more preferably in the range of from 20 to 40 pl and especially of from 25 to 35 pl.

When the ink of the second preferred embodiment, as described above in step (I) is jetted the drop volume of the ink applied by the ink-jet printer is preferably in the range of from 1 to 20 pl and more preferably in the range of from 2 to 8 pl.

A third aspect of the present invention provides a substrate printed by an ink-jet printing process as described in the second aspect of the invention using an ink as described in the first aspect of the invention. This substrate is as described and preferred in the first aspect of the invention.

Thus, is one embodiment the printed substrate is preferably comprises a low density polyethylene film.

In a second embodiment the printed substrate is preferably a substrate which comprises a spunbond film laminate, especially a polypropylene based spunbond film laminate.

More preferably, in the second embodiment, the printed substrate comprises non-woven wipes preferably comprising polypropylene and more preferably comprising a polypropylene based spunbond film laminate.

According to a fourth aspect of the present invention there is provided an ink-jet printer ink container (e.g. a cartridge or a larger ink tank), containing an ink as defined in the first aspect of the present invention A fifth aspect of the present invention provides an ink-jet printer with re-circulating print-head, as described in the second aspect of the invention, and an ink-jet ink container containing an ink, as described in the fourth aspect of the invention.

A sixth aspect of the invention provides an ink-set comprising a black ink, a cyan ink, a yellow ink and a magenta ink wherein the inks are as described and preferred in the first aspect of the invention. Preferably the pigment in the black ink is carbon black; in the cyan ink is Pigment Blue 15:3; in the yellow ink is Pigment Yellow 74 (or Pigment Yellow 155); and in the magenta ink is Pigment Red 122. The ink set may also contain a blue ink and a red ink. Preferably the pigment in the blue ink is Pigment Blue 60 and the pigment in the red ink is Pigment Red 254.

EXAMPLE 1

The present invention will now be illustrated by the following examples in which all parts are by weight unless stated to the contrary.

The self-dispersible pigment used was Pro-Jet® APD 1000 Black. Identical inks may be prepared using Pro-Jet® APD 1000 Cyan, Magenta, Yellow and Yellow LF, Red and Blue.

Surfynol® 440 is an acetylenic surfactant from Air Products.

Rovene® 6102 is a styrene acrylic dispersion from Mallard Creek Polymers. The Tg of Rovene 6102 is 20° C. and the acid number is 50 mgKOH/g.

1,2-Benzisothazolin-3-one was obtained as Proxel® GXL (20% solution) from Lonza.

Example Ink 1

| Component | Formulation At 100% Active (Wt %) |
|---|---|
| Pigment | 2.00 |
| Glycerol | 3.75 |
| Ethylene glycol | 1.25 |
| 2 Pyrrolidone 95% | 5.00 |
| Surfynol 440 | 0.28 |
| 1,2-Benzisothazolin-3-one | 0.02 |
| Rovene 6102 | 7.50 |
| PEG 20K | 6.45 |
| DI Water | to 100 |
| Properties | |
| pH | 8.39 |
| Viscosity at 32° C. cP | 13.32 |
| Surface Tension D/cm | 35.59 |

Example Ink 2

| Component | Formulation At 100% Active (Wt %) |
|---|---|
| Pigment | 2.00 |
| Glycerol | 3.75 |
| Ethylene glycol | 1.25 |
| 2 Pyrrolidone 95% | 5.00 |
| Dynol 810 | 0.24 |
| 1,2-Benzisothazolin-3-one | 0.02 |
| Rovene 6102 | 7.50 |
| PEG 20K | 6.45 |
| DI Water | to 100 |
| Properties | |
| pH | 8.42 |
| Viscosity at 32° C. cP | 12.95 |
| Surface Tension D/cm | 35.35 |

The inks were printed through a StarFire® SG1024 re-circulating print head from FUJIFILM Dimatix. The StarFire® SG1024 re-circulating print head is commonly only used with non-aqueous inks due to a tendency of its face plate to "wet" when used with aqueous inks, thus adversely effecting printer performance.

However the example inks printed without any problems. The print head was photographed with a JetXpert drop watcher. There was no evidence of any face plate wetting with the ink of the present invention.

Comparative Ink Example 1

| Component | Formulation At 100% Active (Wt %) |
|---|---|
| Pro-Jet APD 1000 Black | 2.00 |
| Glycerol | 3.75 |
| Ethylene glycol | 1.25 |
| 2 Pyrrolidone 95% | 5.00 |
| Surfynol 440 | 0.5 |
| 1,2-Benzisothazolin-3-one | 0.02 |
| Acrylic latex | 5.50 |
| PEG 20K | 5.75 |
| DI Water | to 100 |
| Properties | |
| pH | 8.4 |
| Viscosity at 32° C. cP | 14.36 |
| Surface Tension D/cm | 35.54 |

Comparative Ink Example 2

| Component | Formulation At 100% Active (Wt %) |
|---|---|
| Pro-Jet APD 1000 Black | 2.00 |
| Glycerol | 3.75 |
| Ethylene glycol | 1.25 |
| 2 Pyrrolidone 95% | 5.00 |
| Surfynol 465 | 1.85 |
| 1,2-Benzisothazolin-3-one | 0.02 |
| Acrylic latex | 7.50 |
| PEG 20K | 5.45 |
| DI Water | to 100 |
| Properties | |
| pH | 8.34 |
| Viscosity at 32° C. cP | 13.24 |
| Surface Tension D/cm | 35.38 |

Ink Example Ink 1 and Comparative Ink Examples 1 and 2 were printed onto a polyolefin film.

The prints were assessed for wet crock-fastness using the protocol of ASTM D5264 method as revised in F1571

The results are shown below where a higher number reflects a higher wet crock-fastness.

| | Wet Crock-fastness |
|---|---|
| Ink 1 | 2.90 |
| Comparative Ink 1 | 1.67 |
| Comparative Ink 2 | 1.07 |

Clearly the ink of the present invention displays a superior wet crock-fastness to the comparative inks.

Foam Testing

To test the inks resistance to foaming 2 ml of ink was introduced into a disposable 12 cm plastic test tube. Air was then bubbled through the ink for 2 min to allow foam formation. The ink was allowed to stand for 2 min so as to allow the foam to dissipate. Measurements of the height of the foam formed on the ink were recorded at 30 S time interval during the foam rise and during foam dissipation. The test was carried out in triplicate and the average results are shown in the Table below

| Time | Liquid/Foam Height Example Ink 1 | Liquid/Foam Height Comparative Example Ink 2 |
| --- | --- | --- |
| 0 | 0.40 cm | 0.40 cm |
| 30 s | 2.90 cm | 3.23 cm |
| 60 s | 4.70 cm | 5.33 cm |
| 90 s | 5.77 cm | 7.03 cm |
| 120 s | 7.00 cm | 8.53 cm |
| Air flow stopped | | |
| 30 s | 5.87 cm | 8.10 cm |
| 60 s | 4.63 cm | 7.10 cm |
| 90 s | 3.13 cm | 6.37 cm |
| 120 s | 1.50 cm | 5.47 cm |

Clearly the ink of the present invention shows a much lower tendency to foam than the comparative ink and any foam formed dissipates much more rapidly.

The invention claimed is:

1. An ink comprising:
   (a) from 0.5 to 5 parts of a self-dispersible pigment;
   (b) from 5 to 8 parts of a styrene acrylic latex binder;
   (c) from 0 to 5 parts of a glycol selected from the group consisting of ethylene glycol, diethylene glycol, propylene glycol, dipropylene glycol or triethylene glycol;
   (d) from 1 to 10 parts of 2-pyrrolidone;
   (e) from 1 to 15 parts of glycerol;
   (f) from 0.1 to 0.5 parts of 2,4,7,9-tetramethyl-5-decyne-4,7-diol or an ethylene oxide condensate thereof;
   (g) from 0.001 to 5 parts of biocide;
   (h) from 0 to 10 parts of a polyethylene glycol; and
   (i) the balance to 100 parts water, wherein the ink has a surface tension of from 30 to 40 dynes/cm when measured at 25° C. using a Kruss K100 tensiometer.

2. An ink as claimed in claim 1 wherein the self-dispersible pigment is a member selected from the group consisting of Carbon Black; Pigment Blue 15:3; Pigment Blue 60; Pigment Yellow 74; Pigment Yellow 155; Pigment Red 254 and Pigment Red 122.

3. An ink as claimed in claim 1 wherein the self-dispersible pigment comprises a carboxy-functional dispersant crosslinked around a pigment core by a crosslinking agent having at least two groups selected from the group consisting of oxetane, carbodiimide, hydrazide, oxazoline, aziridine, isocyanate, N-methylol, keteneimine, isocyanurate and epoxy groups.

4. An ink as claimed in claim 1 wherein the self-dispersible pigment comprises a carboxy-functional dispersant crosslinked around a pigment core by two or more epoxy groups.

5. An ink as claimed in claim 1 wherein the glycol comprises ethylene glycol.

6. An ink as claimed in claim 1 wherein the glycol is in the range of from 0.75 to 2.0 parts.

7. An ink as claimed in claim 1 wherein the 2-pyrrolidone is present in the range of from 2.5 to 7.5 parts.

8. An ink as claimed in claim 1 wherein the glycerol is present in the range of from 2 to 7.5 parts.

9. An ink as claimed in claim 1 wherein the acetylenic surfactant comprises 2,4,7,9-tetramethyl-5-decyne-4,7-diol.

10. An ink as claimed in claim 1 wherein the polyethylene glycol comprises polyethylene glycol 20,000.

11. An ink as claimed in claim 1 comprising:
    (a') 0.75 to 4 parts of a self-dispersible pigment;
    (b') 5 to 8 parts of a styrene acrylic latex binder;
    (c') 0.5 to 2.5 parts of ethylene glycol;
    (d') 2.5 to 7.5 parts of 2-pyrrolidone;
    (e') 2 to 7.5 parts of glycerol;
    (f') 0.1 to 0.5 parts of 2,4,7,9-tetramethyl-5-decyne-4,7-diol;
    (g') 0.001 to 2 parts of biocide;
    (h') 3 to 8 parts of a polyethylene glycol;
    (i') the balance to 100 parts water.

12. An ink-jet printing process wherein the ink according to claim 1 is printed onto a substrate using an ink-jet printer with an ink re-circulating print-head.

13. A substrate printed by an ink-jet printing process as described in claim 12.

14. An ink-jet printer ink container containing an ink as defined in claim 1.

* * * * *